United States Patent [19]
Cachat

[11] 3,775,831
[45] Dec. 4, 1973

[54] METHOD OF PRODUCING A RING GEAR AND FLYWHEEL ASSEMBLY

[75] Inventor: John F. Cachat, Cleveland, Ohio

[73] Assignee: Park Ohio Industries, Inc., Cleveland, Ohio

[22] Filed: July 20, 1972

[21] Appl. No.: 273,525

[52] U.S. Cl.................... 29/447, 148/147, 148/150, 219/10.59, 219/10.79
[51] Int. Cl............................................ B23p 11/02
[58] Field of Search...................... 219/10.59, 10.79; 148/147, 150, 154; 29/447; 294/65.5

[56] References Cited
UNITED STATES PATENTS

| | | | |
|---|---|---|---|
| 2,598,694 | 6/1952 | Herbenar | 219/10.59 |
| 3,122,625 | 2/1964 | Lenz | 219/10.79 |
| 2,454,039 | 11/1948 | Cox | 219/10.59 |
| 2,188,569 | 1/1940 | Endsley | 29/447 |
| 2,958,619 | 11/1960 | Frost | 148/150 |
| 3,527,627 | 9/1970 | Pfaffman et al. | 148/147 |
| 3,690,468 | 9/1972 | Decker et al. | 294/65.5 |
| 3,693,126 | 9/1972 | Rybak | 294/65.5 |

*Primary Examiner*—Richard J. Herbst
*Assistant Examiner*—James R. Duzan
*Attorney*—James H. Tilberry et al.

[57] ABSTRACT

There is provided a method for producing a ring gear and flywheel assembly, which method includes the use of a shuttle arrangement for moving successive ring gears through a high frequency induction heating and quench hardening station, a lower frequency tempering station, and a station wherein the heated ring gear is magnetically held and shifted over the outer periphery of an aligned flywheel preparatory to cooling of the ring gear to shrink fit it upon the flywheel.

8 Claims, 13 Drawing Figures

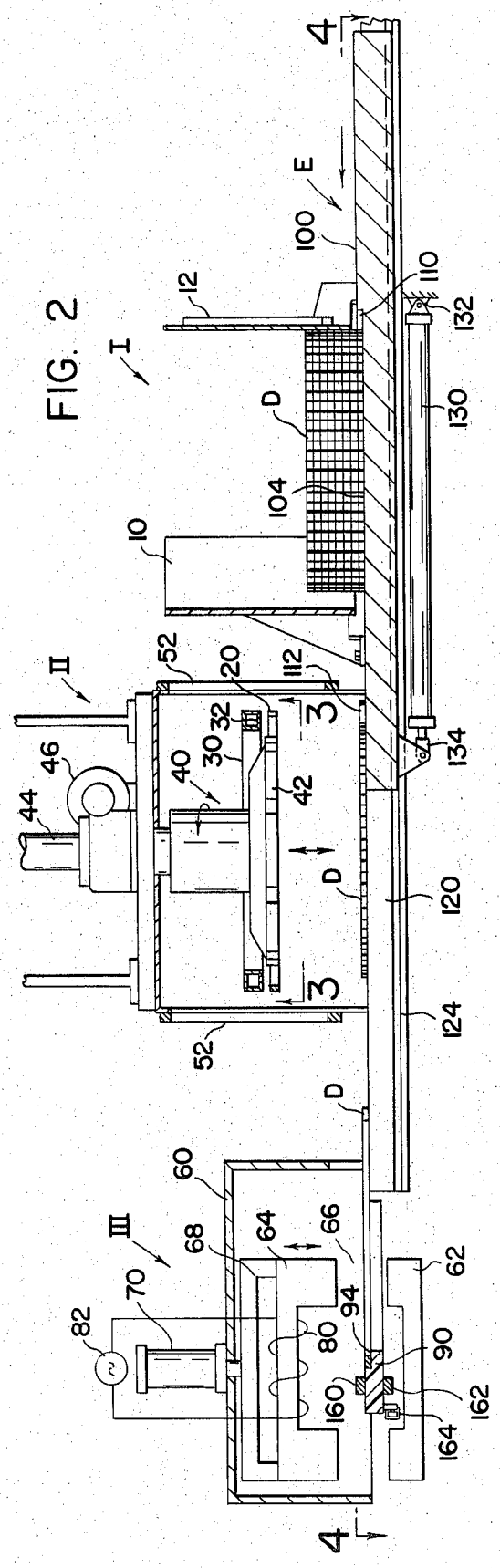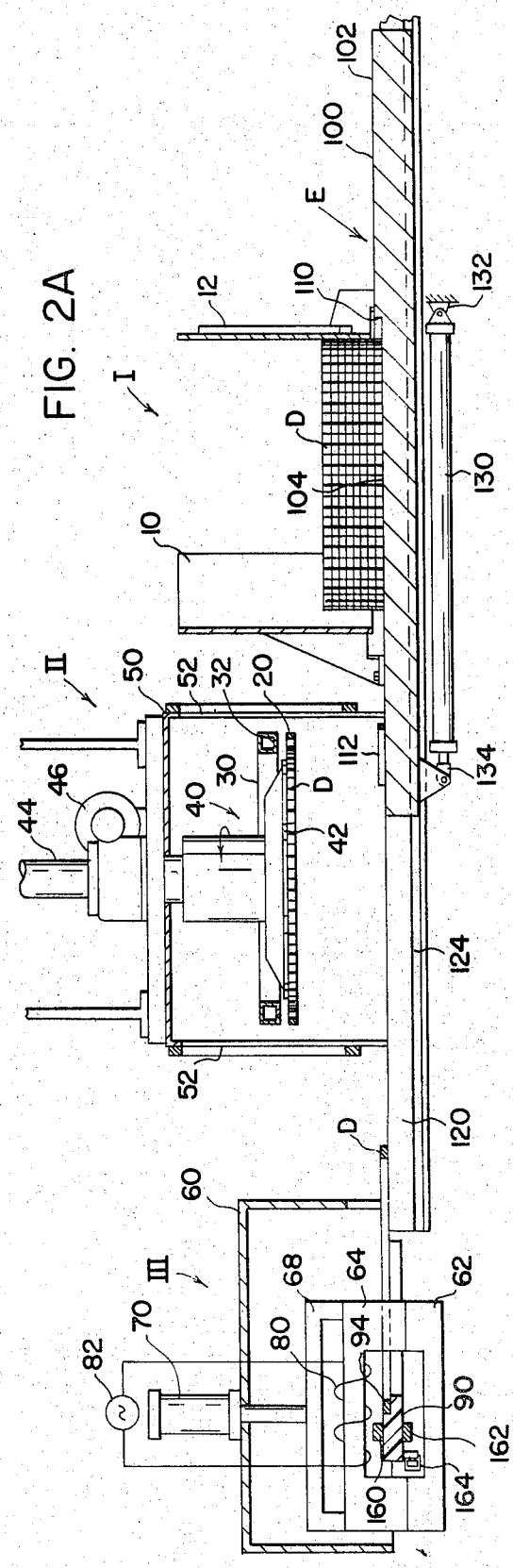

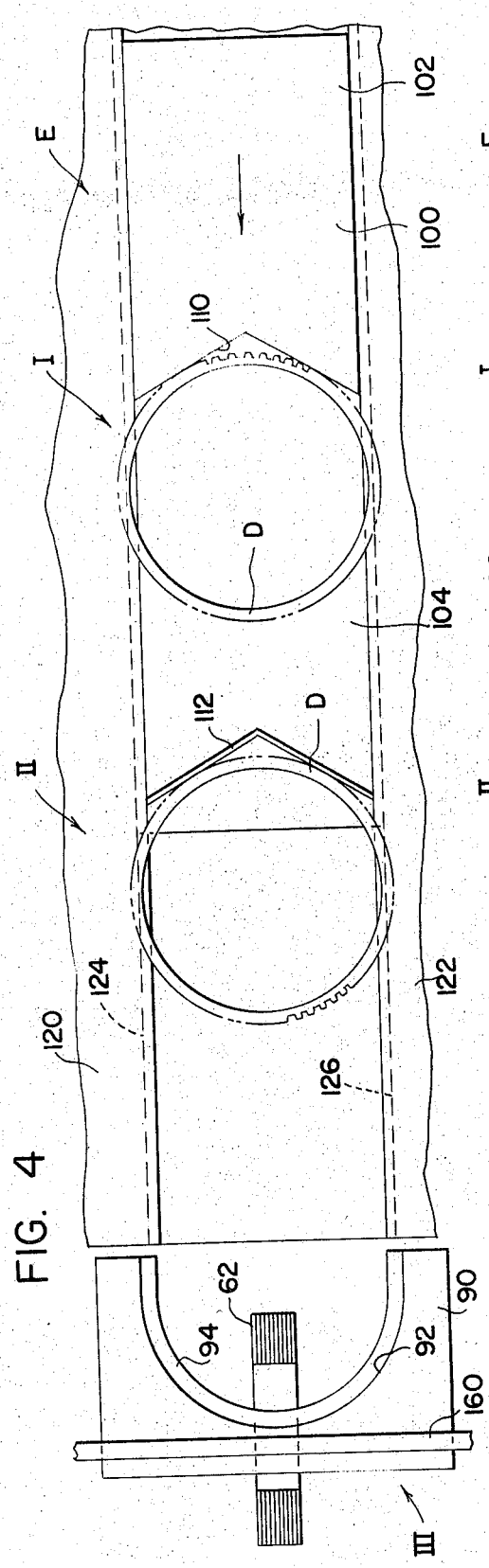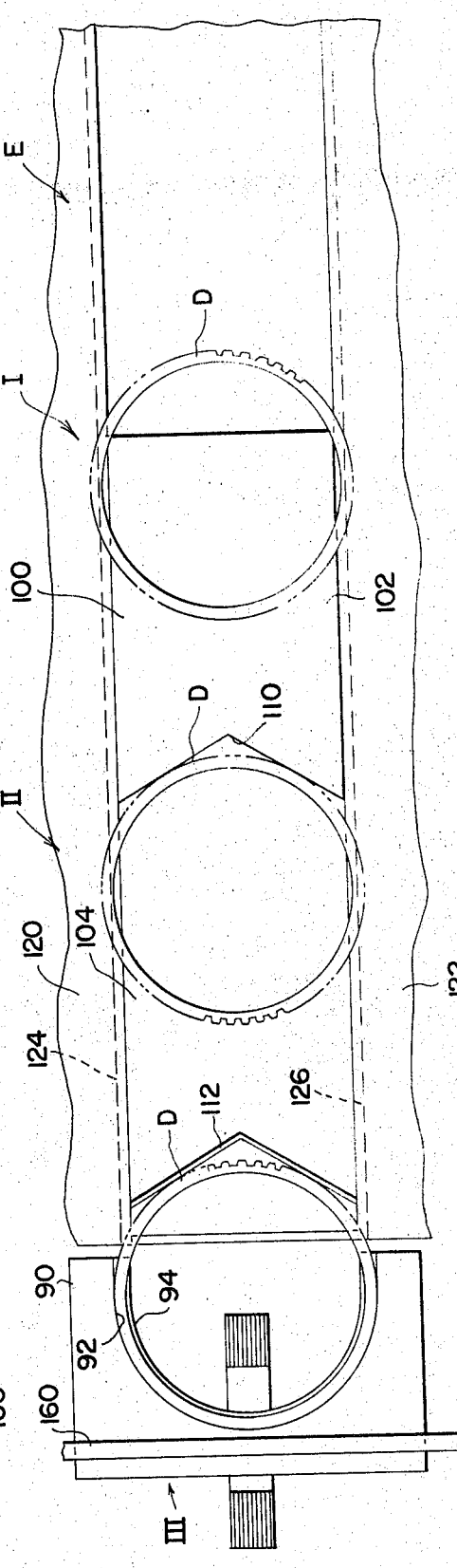

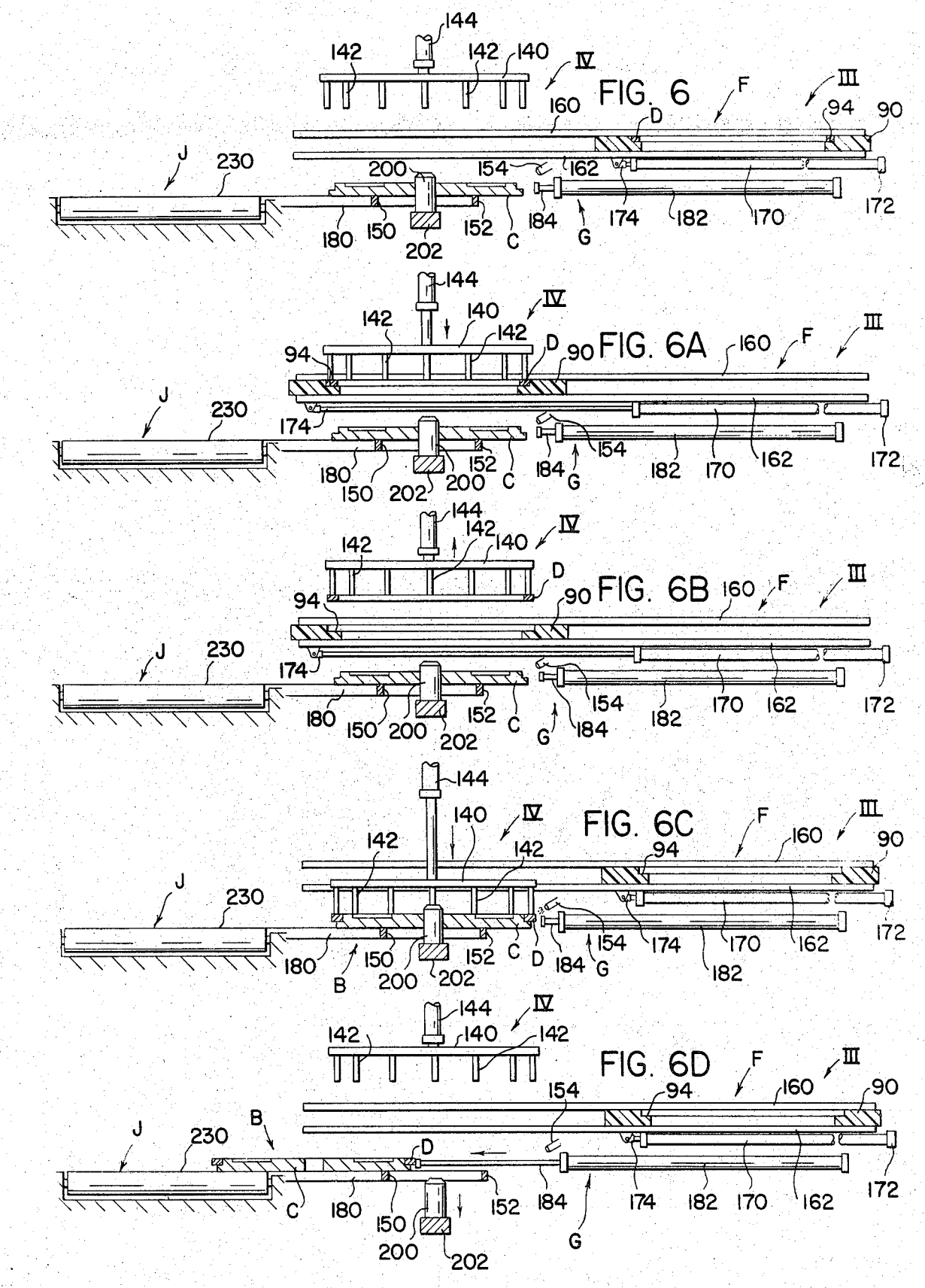

METHOD OF PRODUCING A RING GEAR AND FLYWHEEL ASSEMBLY

The invention relates to the general art of induction heating and more particularly to a method for using induction heating for producing a ring gear and flywheel assembly.

The invention is particularly applicable for hardening and mounting a ring gear onto the flywheel of an internal combustion engine and it will be described with particular reference thereto; however, it is appreciated that the invention has much broader applications and may be used for hardening and mounting a ring gear onto various types of mounting structures.

Internal combustion engines generally include a flywheel mounted upon the end of a crankshaft, which flywheel includes a peripherally extending ring gear for engagement with a pinion on the starting motor. The ring gear and flywheel are produced separately and then assembled into a unit. Before being assembled, the ring gear is heated and quench hardened to provide for improved wear characteristics. Generally, after this hardening operation, the ring gear is tempered to remove surface stresses and reduce brittleness in the individual teeth around the gear.

In the past, the ring gear was inductively heated and quench hardened in a separate station. The hardened gear was then removed and tempered in an appropriate furnace. After being tempered, the ring gear was secured onto the outer periphery of an appropriately proportioned flywheel. All of these operations require a substantial amount of manual handling of both the flywheel and the ring gear. This could result in damage and definitely resulted in relatively high labor costs in the production of the flywheel and ring gear assembly.

The present invention relates to a method of producing a flywheel and ring gear assembly which method requires a relatively minor amount of manual handling and generally reduces the processing time and steps in the production of this assembly.

In accordance with the present invention, there is provided a method of producing an assembly including a ring gear having a peripheral cross-section and secured onto the outer periphery of a generally circular support base, such as a flywheel. This method includes the steps of providing a shuttle having first and second ring gear receiving nests, positioning a hardened ring gear in the first nest and an unhardened ring gear in the second nest, moving the shuttle into a position with the first nest aligned with a tempering device and the second nest aligned with a hardening device, inductively heating and quench hardening the unhardened ring gear, inductively heating the hardened ring gear to a tempering temperature, placing the hardened ring gear around the support base before it has cooled below a selected temperature, and cooling the hardened ring gear whereby it is shrunk onto the support base.

The primary object of the present invention is the provision of a method for producing a ring gear and flywheel assembly, which method reduces the handling of the ring gear and flywheel.

Another object of the present invention is the provision of a method for producing a ring gear and flywheel assembly, which method requires a minimum of equipment and floor space.

Yet another object of the present invention is the provision of a method for producing a ring gear and flywheel assembly, which method is substantially less costly than prior methods for performing this function.

These and other objects and advantages will become apparent from the following description taken in conjunction with the accompanying drawings in which:

FIG. 2 is an enlarged, schematic view taken generally along line 2—2 of FIG. 1;

FIG. 2A is a view similar to FIG. 2 showing an operation of the apparatus illustrated in FIG. 1;

FIG. 4 is a schematic view taken generally along line 4—4 of FIG. 2;

FIG. 5 is a view similar to FIG. 4 illustrating operating characteristics of the structure disclosed therein;

FIG. 6 is a schematic, partial, enlarged cross-sectional view taken generally along line 6—6 of FIG. 1;

FIGS. 6A–6D are progressive views similar to FIG. 6 illustrating operating characteristics of the structure shown therein;

Figure 1:
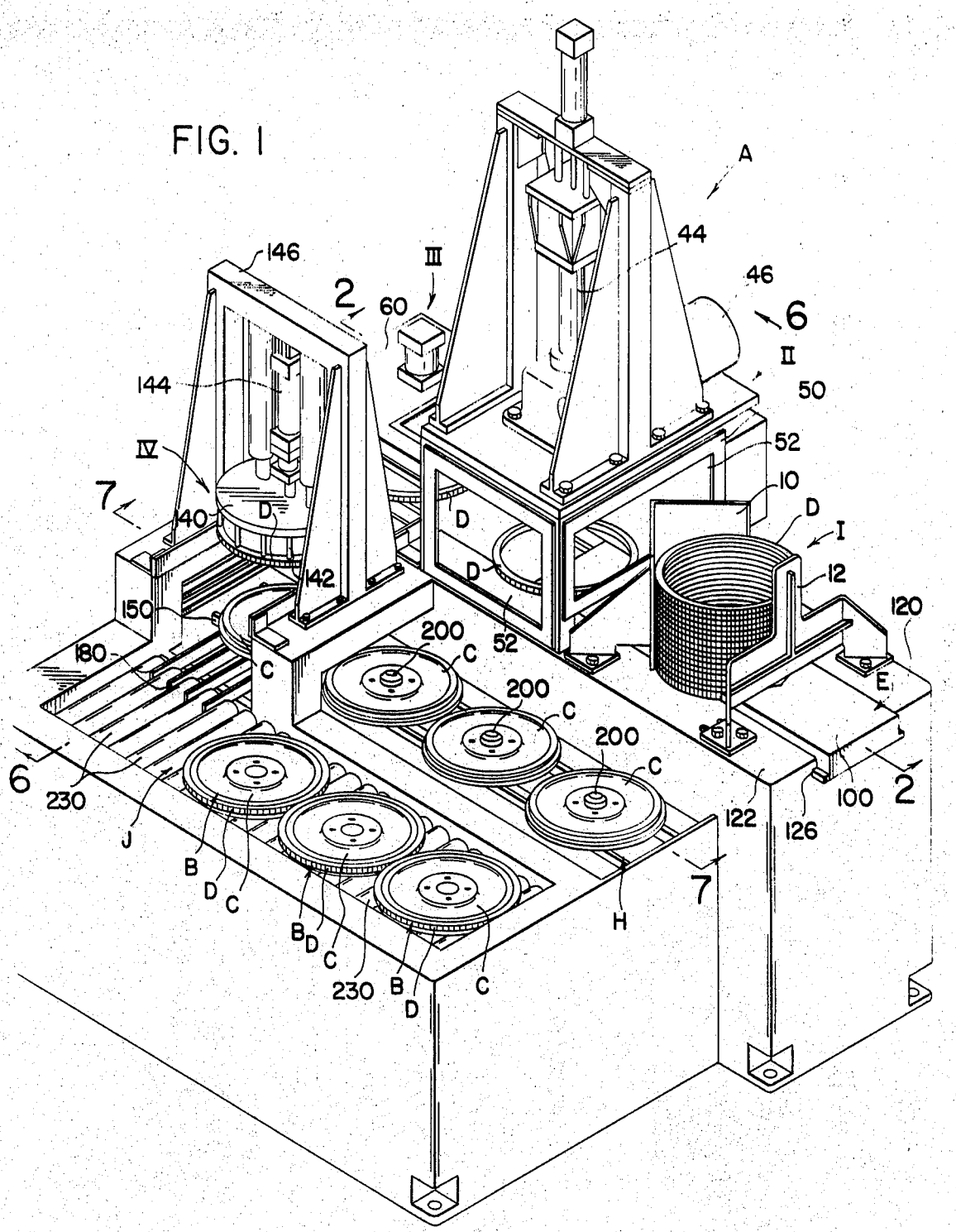
FIG. 1 is a pictorial view illustrating an apparatus for performing the preferred embodiment of the present invention.
Figure 8:
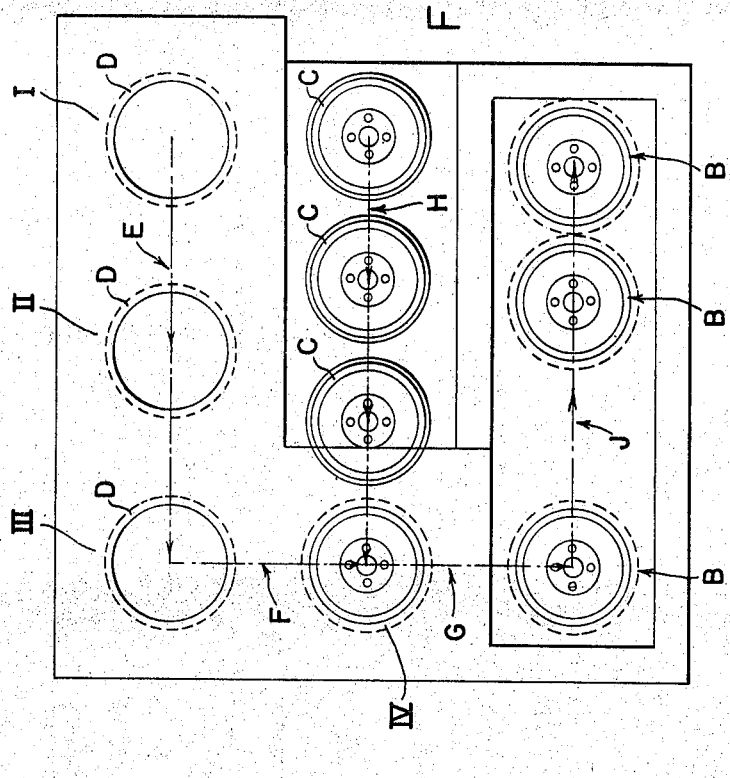

Referring now to the drawings wherein the showings are for the purpose of illustrating a preferred embodiment of the invention only, and not for the purpose of limiting same, FIG. 1 shows an apparatus A for producing an assembly B formed from joining flywheels C and ring gears D. This apparatus includes four stations I, II, III and IV which combine to perform the assembly operation. Station I includes a stack of ring gears D and provides a ring gear supply for the apparatus A. Station II inductively heats the ring gears with a high frequency and then quench hardens the heated ring gear. Station III heats the ring gear to a tempering temperature with a low frequency alternating current to produce a tempered ring gear which is shifted to station IV and assembled onto a flywheel C before it has cooled. At station IV, the ring gear is cooled so that it shrinks over the flywheel and forms a unitary assembly B. As schematically illustrated in FIG. 8, a plurality of diverse conveyors are employed for shifting the various components through the apparatus A. Conveyor E moves the ring gears successively through stations I, II and III. Conveyor F shifts the ring gear D from the station III to the station IV where it is assembled onto its flywheel C. Thereafter, conveyor G shifts the assembly from station IV. A conveyor H supplies flywheels C to the apparatus A and specifically to station IV. Conveyor J directs the completed assembly B from the apparatus A.

In operation, the ring gears D are stacked at station I, and a succession of flywheels C are placed onto conveyor H. An operator at the entrant end of conveyor H places these flywheels in position and removes completed assemblies B from the exit side of conveyor J.

During the heating operation at station II, the ring gear D is inductively heated to a temperature above the hardening temperature which may be in the range of 1,700°–2,000°F. When at the tempering station III, the ring gear is heated to a temperature in the approximate range of 700°–1,100°F. Before the temperature of the ring gear has decreased to below approximately 500°–600°F, the ring gear is placed over the outer periphery of the flywheel C and is then quenched at station IV. This shrinks the ring gear over the outer periphery of the flywheel and finalizes the intended assembly. The ring gear, after tempering, has a hardness of approximately 55–60 Rockwell C.

Figure 3:
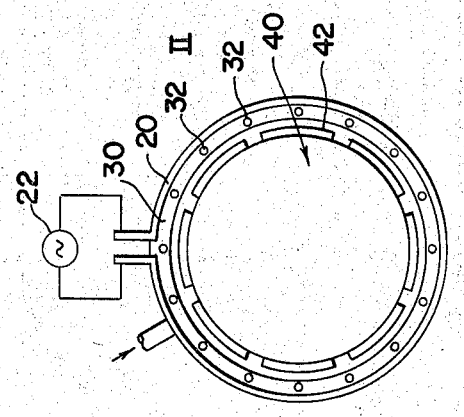
FIG. 3 is an enlarged, schematic view taken generally along line 3—3 of FIG. 2.

Referring now in more detail to the apparatus A, FIGS. 2, 2A, 3 and 4 illustrate the first three stations of the apparatus. Station I which is essentially a supply stack of ring gears D includes a fixed support 10 and a support 12, which is adjustable to accommodate various size ring gears. Station II includes an inductor having an internal periphery generally matching the outside periphery of ring gear D and connected to a high frequency power supply 22, as schematically shown in FIG. 3. This power supply has an output frequency generally exceeding 3,000 cps so that the ring gear when positioned, as shown in FIG. 2A, can be inductively heated by energizing inductor 20. Above the inductor there is provided a generally circular quench body 30 having downwardly facing holes 32 for directing a quenching fluid against the inductively heated ring gear D. Station II also includes a chuck 40 having a lower head 42 which expands outwardly to grip the inner periphery of a ring gear, a reciprocally mounted shaft 44 and a motor means 46 for rotating the chuck and ring gear inside of the inductor 20. Surrounding the components so far described, there is provided a housing 50 having a plurality of transparent windows 52.

In operation of station II, as best shown in FIG. 2, a ring gear D is positioned directly below chuck 40. The chuck then moves downwardly into the ring gear, and head 42 expands gripping the ring gear. Thereafter, the ring gear D is moved upwardly, as shown in FIG. 2A, and is rotated by motor means 46. While being rotated, power supply 22 is activated to energize inductor 20 for inductively heating the ring gear D. After sufficient time to raise the ring gear above the quench hardening temperature, supply 22 is deactivated and a quench liquid is directed through holes 32 against the heated ring gear. This quench hardens the ring gear to a hardness of generally 60–65 Rockwell C. Thereafter, the rotation of chuck 40 is discontinued and shaft 44 moves the chuck to the downward position for release of the hardened ring gear.

Referring now to station III, there is provided an outer housing 60 in which there is a stationary portion 62 of a laminated core and a movable portion 64 of this core. The core is shiftable between position shown in FIG. 2 and the position shown in FIG. 2A to alternately provide a gap 66 between the two portions of the core. Movable core portion 62 is secured onto a support 68 which is reciprocated selectively by a cylinder 70 secured to the upper wall of the housing 60. As is schematically illustrated, a primary winding 80 is provided around one portion of the laminated core. In the illustrated embodiment, this winding is secured onto the movable portion 64; however, it may be placed on the stationary portion 62. The power supply 82 energizes the winding 80 with a low frequency alternating current, such as 50–60 c.p.s. Between the core portions there is provided a movable nest 90 having a U-shaped opening 92 and a corresponding U-shaped support ridge 94. A hardened ring gear is moved into the nest 90 and rests upon the support ridge 94 when the core portions 62, 64 are opened. Movement of the ring gear is provided through gap 66. Thereafter, cylinder 70 shifts the movable portion 64 downwardly into engagement with the fixed portion 62, as shown in FIG. 2A. Low frequency current is then passed through winding 80 and the ring gear acts as a secondary winding which conducts current and causes heating of the ring gear. As illustrated, the nest 90 is electrically non-conductive; however, the nest may be conductive because there is no circuit created in this U-shaped nest. A heat insulation material could be used to prevent an undue conduction of heat from the ring gear. The ring gear is heated at station III to a temperature in the general range of 700°–1,100°F which causes tempering of the hardened ring gear to a resultant hardness of approximately 55–60 Rockwell C.

Conveyor E, includes a shuttle 100 having a relatively thick rear portion 102 and a thinner forward portion 104. A nest defined by V-shaped wall 110 and a nest formed by V-shaped plate 112 provide two supporting and moving structures for ring gears D as the shuttle 100 is reciprocated between side supports 120, 122 having supporting ways 124, 126, respectively. During this reciprocation the ring gears rest upon the side supports which are generally aligned with portion 104. Cylinder 130 having a fixed bracket 132 and a shuttle supported bracket 134 is used for selectively reciprocating the shuttle 100.

When shuttle 100 is in the rearward position shown in FIGS. 2 and 4, a ring gear within the nest formed by V-shaped plate 112 is at station II. In addition, a ring gear in station I has dropped into the thinner portion 104 of the shuttle 100. Cylinder 30 is then actuated to shift the shuttle 100 to the left, as shown in these figures, which moves a hardened ring gear from station II to station III. At the same time, the ring gear within the nest formed by V-shaped wall 110 is shifted from station I to station II. The thicker portion 102 of shuttle 100 is then located under the stack of ring gears within station I. Wall 112 holds the ring gear in the proper position within the U-shaped opening 92 while the ring gear is being heated in station III. At the same time, chuck 40 raises the ring gear at station II for heating and hardening as previously described.

After the ring gear at station III has been heated to the tempering temperature and the ring gear at station II has been raised, shuttle 100 can be moved rearwardly to the position shown in FIG. 2. Thereafter, station III may be unloaded in a manner to be described later and the hardened ring gear at station II is again placed within the nest defined by V-shaped wall 112. At the same time, the thicker portion 104 disengages the bottom of the stack station I allowing another ring gear to drop into the nest formed by V-shaped wall 110. The cycle is then repeated to successively harden and temper ring gears D.

Referring now to FIGS. 6 and 6A–6D, the operation at station IV is illustrated. This station includes a reciprocal plate 140 having downwardly extending magnets 142 which are adapted to engage the upper surface of ring gear D. A cylinder 144 supported on a hanger 146, shown in FIG. 1, selectively reciprocates plate 140 in a vertical direction with respect to lower rails 150, 152. A quenching arrangement is provided for cooling the ring gear after it has been assembled onto a flywheel C. This is schematically illustrated as nozzles 154 which are spaced around the station IV. Only one of the nozzles is illustrated for simplicity.

To bring the rear gear D from station III to station IV, there is provided an appropriate conveyor device schematically illustrated as conveyor F and including supporting and guide rails 160, 162 extending from station III and supporting nests 90 for reciprocal movement between these stations. To provide further support, it is possible to include a plurality of guide rollers 164, shown in FIG. 2, which ride in a track extending between these two stations. A cylinder 170 having a fixed end 172 and a movable end 174 is employed for selectively moving nests 90 between stations III and IV. In operation, before the ring gear D has cooled below a temperature which will allow subsequent shrink fitting over the flywheel, which temperature is generally above 600°–700°F, cylinder 170 shifts the nest along rails 160, 162 into the position shown in FIG. 6A. At this time, the plate 140 is moved downwardly so that magnets 142 engage the ring gear D. The ring gear is formed of ferromagnetic material and the temperature of the ring gear as it is moved into the position illustrated in FIG. 6A is below the Curie Point; therefore, the magnets 142 magnetically couple themselves with the ring gear. These magnets have sufficient magnetic strength to hold the weight of the ring gear as the cylinder 144 moves plate 140 upwardly from the nest 90 and removes the ring gear therefrom. This is shown in FIG. 6B. Thereafter, nest 90 is returned to station III, as shown in FIG. 6C. At this time, cylinder 144 moves plate 140 downwardly to position the ring gear around the appropriate periphery on the flywheel C aligned below the ring gear and supported on rails 150, 152. Plate 140 remains in this position to hold the ring gear as a coolant is directed through nozzle 154 for cooling the ring gear and allowing it to shrink into a shrink fit connection with the flywheel C.

As shown in FIG. 6D, the plate 150 is then moved upwardly by cylinder 144. At this time, the magnets 142 do not have sufficient magnetic strength to lift both the ring gear and the attached flywheel; therefore, the assembly B remains at station IV. Of course, magnets 142 could be electro-magnets which are de-energized to release the ring gear from its position. Since the magnets hold the ring gear in place during the quenching, proper alignment of the ring gear on the flywheel is maintained.

Conveyor G including transversely extending rails 180 and a cylinder 182 having a plunger 184 then ejects the assembly B from station IV and onto conveyor J. This requires a release of the workpiece from conveyor H which includes support pegs 200 mounted on a longitudinally reciprocated and vertically movable rod 202. Release of the assembly is illustrated in FIG. 6D.

Figure 7:
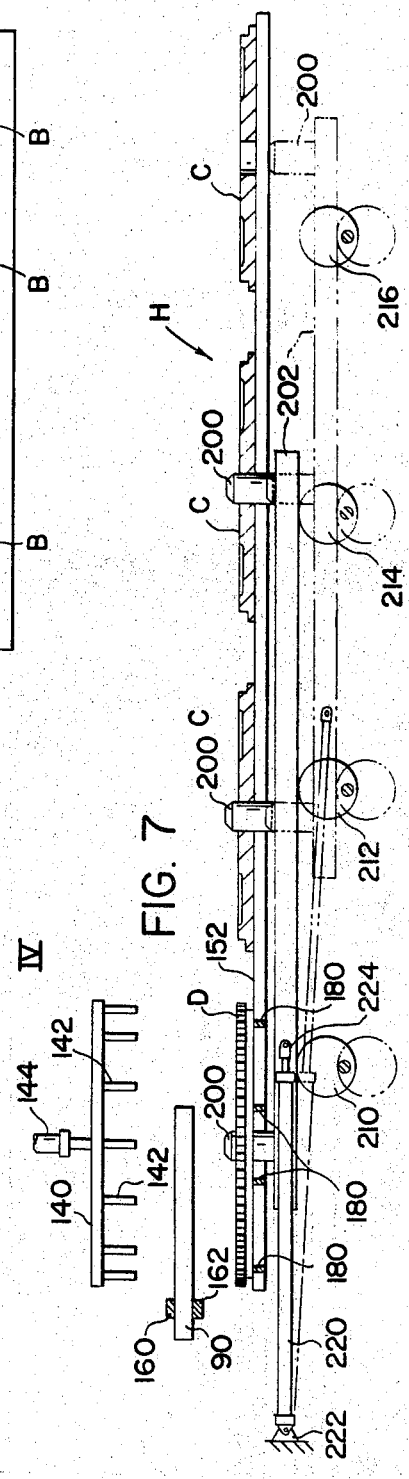
FIG. 7 is an enlarged, partial, schematic cross-sectional view taken generally along line 7—7 of FIG. 1; and, FIG. 8 is a flow chart for the parts as they move through the apparatus illustrated in FIG. 1.

Referring now to FIG. 7, more details of a conveyor for moving the flywheels C are illustrated. Of course, various conveyors could be used for this purpose. In accordance with the illustrated embodiment, rod 202 is supported on cams 210, 212, 214 and 216. When these cams are rotated from the solid line position to the dotted line position, rod 202 is moved vertically downwardly and pegs 200 disengage from openings in the flywheels C. While in the downward position, a cylinder 220 having a fixed end or bracket 222 and a movable end 224 secured to the rod 202 can reciprocate the rod and pegs from one position to another in a longitudinal direction. Consequently, in operation of this conveyor an operator places a flywheel C at the right end of the conveyor. Thereafter, pegs 200 move upwardly engaging the central opening of each of three flywheels. Cylinder 220 then shifts the rod 202 to the left as shown in FIG. 7. This brings one flywheel into the proper position within station IV. Thereafter, cams 210–216 are rotated to the phantom position allowing the rod 202 to move downwardly releasing all the flywheels. Thereafter, cylinder 220 moves to the right into the phantom line position. Then, cams 210–216 are rotated to the solid line position which again engages the pegs 200 with three successive flywheels. This disengages the flywheels at station IV. This successive reciprocation and longitudinal movement of rods 202 progressively shifts flywheels into station IV where they are provided with a ring gear. Rails 150, 152 support these successively moving flywheels so that they do not move downwardly as rod 202 is moved in the downward direction.

Referring now to FIG. 1, conveyor J includes a series of driven rollers 230 which receive an assembly B ejected from station IV.

This completes the description of apparatus A and the operation of the several elements therein. It should be appreciated that various modifications may be made in these elements without departing from the intended spirit and scope of the invention as defined in the appended claims.

Having thus defined my invention, I claim:

1. A method of producing an assembly including a ring gear having a peripheral cross section and secured onto the outer periphery of a generally circular support base, said method comprising the steps of:
   a. rotating said ring gear at a first station;
   b. inductively heating said rotating gear by a high frequency inductor to a temperature above its hardening temperature;
   c. quenching said inductively heated workpiece;
   d. moving said workpiece to a second station;
   e. placing a transformer core around the peripheral cross section of said ring gear;
   f. energizing said core with a low frequency current until said ring gear is heated to a tempering temperature substantially below said hardening temperature;
   g. removing said core from around said peripheral cross section;
   h. placing said ring gear over said support base while said ring gear remains heated above a selected temperature; and,
   i. then cooling said ring gear whereby said ring gear is shrunk onto said support base.

2. The method as defined in claim 1 wherein said hardening temperature is above 1,700°F.

3. The method as defined in claim 2 wherein said tempering temperature is in the approximate range of 700°–1,100°F.

4. The method as defined in claim 3 wherein said selected temperature is above about 600°F.

5. The method as defined in claim 1 wherein said selected temperature is above about 600°F.

6. A method of producing an assembly including a ring gear having a peripheral cross section and secured onto the outer periphery of a generally circular support base, said method includes the steps of:
   a. providing a shuttle having first and second ring gear receiving nests;

b. positioning a hardened ring gear in said first nest and an unhardened ring gear in said second nest;

c. moving said shuttle into a position with said first nest aligned with a tempering device and said second nest aligned with a hardening device;

d. inductively heating and quench hardening said unhardened ring gear;

e. inductively heating said hardened ring gear to a tempering temperature;

f. placing said hardened ring gear around said support base before it has cooled below a selected temperature; and, g. cooling said hardened ring gear whereby it is shrunk into said support base.

7. A method of producing an assembly including a ring gear having a peripheral cross section secured onto the outer periphery of a flywheel, said method comprising the steps of:

a. providing a shuttle having first and second ring gear receiving nests and movable between a first position with said first nest at a first station and said second nest at a second station and a second position with said first nest at said first station and said second nest at a third station;

b. placing a first ring gear in said first nest at said first station where said shuttle is in said first position;

c. shifting said shuttle to said second position with said first nest and first ring gear being at said second station;

d. lifting said ring gear from said first nest;

e. inductively heating said first ring gear with an inductor energized by a high frequency current;

f. quench hardening said first ring gear;

g. shifting said shuttle into said first position;

h. placing a second ring gear into said first nest and placing said first ring gear into said second nest;

i. shifting said shuttle into said second position with said first ring gear at said third station and said second ring gear at said second station;

j. inductively heating said first ring gear with a surrounding transformer core energized by a low frequency;

k. then placing said heated first ring gear around the outer periphery of said flywheel; and, l. cooling said ring gear whereby said ring gear is shrunk onto said flywheel.

8. A method of assembling a heated ferromagnetic ring gear onto the outer periphery of a flywheel, said method comprising the steps of:

a. heating said ring gear to a temperature above about 600°F and below the Curie Point of the ring gear;

b. shifting said heated ring gear below a movable magnetic element;

c. holding said ring gear onto said magnetic element;

d. supporting a flywheel below said ring gear;

e. moving said element downwardly to position said heated ring gear around said outer periphery of said flywheel;

f. holding said ring gear in place on said outer periphery; and, g. simultaneously cooling said ring gear whereby it is shrunk onto said flywheel.

* * * * *